United States Patent [19]

Bradley et al.

[11] 3,954,698

[45] May 4, 1976

[54] POLYMERISATION PROCESS

[75] Inventors: Basil John Bradley, Barry; Peter James Craig, Dinas Powis; Geoffrey James Gammon, Wenvoe, all of Wales

[73] Assignee: BP Chemicals International Limited, London, England

[22] Filed: Dec. 20, 1974

[21] Appl. No.: 534,790

[30] Foreign Application Priority Data

Dec. 26, 1973 United Kingdom............... 30183/73

[52] U.S. Cl..................................... 526/79; 526/80; 526/344

[51] Int. Cl.² ................. C08F 2/18; C08F 114/06; C08F 114/16; C08F 114/20

[58] Field of Search...................... 260/92.8 W, 92.1

[56] References Cited

UNITED STATES PATENTS

| | | | |
|---|---|---|---|
| 3,324,097 | 6/1967 | Pears............................ | 260/92.8 W |
| 3,375,238 | 3/1968 | Bauer et al................... | 260/92.8 W |
| 3,390,142 | 6/1968 | Benetta et al................ | 260/92.8 W |
| 3,488,328 | 1/1970 | Koyanagi et al............. | 260/92.8 W |
| 3,536,675 | 10/1970 | Fagnoni et al............... | 260/92.8 W |
| 3,563,238 | 2/1971 | Parks............................ | 260/92.8 W |
| 3,661,881 | 5/1972 | Moore........................... | 260/92.8 W |

*Primary Examiner*—Alan Holler
*Attorney, Agent, or Firm*—Brooks Haidt Haffner & Delahunty

[57] ABSTRACT

Vinyl halide is homopolymerized under suspension conditions with additional vinyl halide being added after the pressure drop with polymer being recovered only after the polymerisation is completed.

7 Claims, No Drawings

POLYMERISATION PROCESS

The present invention relates to a process for the suspension polymerisation of vinyl halides.

There are three types of aqueous dispersion polymerisation commonly used for vinyl halides. These are often known as suspension, emulsion and microsuspension. Suspension polymerisation uses a monomer soluble free radical initiator and the dispersion droplet size is large, giving polymer particles of a size greater than about 50 μm, which can be separated from the dispersion by centrifuging or filtering. The dispersion is stabilised by such substances as cellulose ethers, polyvinyl alcohol, gelatin and finely divided inorganic solids such as hydroxy apatite, which are known as dispersants or suspending agents and are not considered to be true surfactants. Stirring is required during polymerisation in addition to the stabilisers to prevent the dispersion agglomerating and from undergoing sedimentation.

Emulsion polymerisation, on the other hand, uses water soluble initiators and the polymer is formed as a latex of particles usually of less than 1 μm diameter which cannot be separated from the aqueous phase by centrifuging or filtering. True surfactants are used to stabilise the dispersions, which are normally stable on standing, although the polymerisation is stirred.

Microsuspension polymerisations, like suspensions, use monomer soluble initiators but the polymer is formed as a latex of particles, usually less than 2 μm diameter but sometimes up to as much as 20 μm which cannot be separated from the aqueous phase by centrifuging or filtering. These latices are normally isolated by spray drying to give polymers which can form pastes when mixed with plasticisers. True surfactants are used as stabilisers and often a system containing more than one surfactant or surfactants and surfactant modifiers are used. These dispersions unlike suspensions or emulsions cannot simply be produced by stirring the monomer and water in the presence of the surfactant using the normal degree of agitation required during polymerisation.

When vinyl halides are polymerised in aqueous suspension, it is generally necessary to maintain the polymerisation vessel under pressure as the monomers are gaseous at the usual polymerisation temperatures. However, at a certain conversion, which is generally about 70%, a reduction in pressure, known for the purposes of this application as the "pressure-drop" is observed. This is thought to be the point at which all liquid vinyl halide has been absorbed in the polymer formed and thus only gaseous vinyl halide and vinyl halide dissolved in polymer is present. The pressure then falls below the local saturated vapour pressure of the vinyl halide as the gaseous vinyl halide is polymerised.

It is disclosed in U.S. Pat. No. 3,661,881 that monomer may be continuously bled into the reactor after the pressure drop at such a rate as to maintain the pressure at a reduced level in order to reduce polymer particle porosity. The importance of maintaining the pressure below the original level is stressed although this requirement leads to greater complications in the operation of polymerisation reactors.

British patent specification No. 1,348,426 relates to a batch process for the suspension polymerisation of vinyl chloride in which vinyl chloride is fed in continuously over an initial period of polymerisation, the addition of monomer being stopped, at the latest after 70% of the total vinyl chloride introduced has reacted i.e. the addition of vinyl chloride is not continued after the pressure drop. It is stated that where the continuous addition of vinyl chloride is continued after the pressure drop the number of specks in the product is increased but the other properties are not affected. A similar result is obtained if the process is operated on a semi-continuous basis by withdrawing a portion of the reaction mixture at the pressure drop and replacing it with a fresh charge of monomer and water.

We have found that beneficial results are obtained if instead of feeding in monomer over a prolonged period of time the monomer is added rapidly at a specified period after the pressure drop.

Accordingly, the present invention is a batch process for the homo-polymerisation of a vinyl halide monomer which comprises homo-polymerising the monomer in aqueous suspension in the presence of a monomer soluble free radical initiator until the start of the pressure drop and thereafter adding not more than 50% by weight of initial vinyl chloride of fresh vinyl halide over not more than 15 minutes in a period in which the conversion is in the range 70% to 80% by weight of the monomer initially added, completing the polymerisation, and only then recovering the monomer.

Any polymerisable vinyl halide-containing monomeric material may be used, but the preferred monomer is vinyl chloride.

It is preferred that the vinyl halide added to the polymerization after the pressure drop is bulk monomer, that is vinyl halide which is not dispersed or suspended in water.

The polymerisation is carried out in a monomeric material-in-water suspension, i.e. in a turbulence-stabilised dispersion containing suspending agent and using a monomer soluble free radical initiator.

The monomeric material to water phase ratio is not critical provided that sufficient water is present to allow the monomeric material to be maintained in dispersion therein. Preferably this ratio is in the range 1:1 to 1:3 by weight, and more preferably 1:1.1 to 1:2.5 by weight.

It is preferred to fully charge the reactor with monomer and water, i.e. to employ the amount of monomer and water which would normally be fed to the reactor in the absence of any subsequent addition of monomer.

The polymerisation process may be carried out at conventional temperatures used for the suspension polymerisation of vinyl chloride. Suitably a temperature in the range +5° to +75°C is used. The polymerisation temperature may be varied during the reaction.

Suitable initiators include lauroyl peroxide, caprylyl peroxide, benzoyl peroxide, tertiary butyl peroxypivalate, 2-azobisisobutyronitrile, peroxydicarbonates such as ditertiary-butylcyclohexylperoxydicarbonate, diethyl peroxydicarbonate, dicyclohexylperoxydicarbonate and diisopropylperoxydicarbonate. Other suitable initiators are those which are formed 'in situ' in the reaction medium; for example, the initiator formed by the reaction of a chloroformate, such as ethyl chloroformate or isopropylchloroformate, and hydrogen peroxide under alkaline conditions.

Combinations of the above initiators may also be used.

The amount of initiator used may be similar to that used in conventional vinyl halide suspension polymerisation processes. Fresh initiator may also be added together with the extra monomeric material which is added to the polymerisation system during the pressure-drop period.

Suitable suspending agents include insoluble inorganic phosphates such as hydroxyapatite and organic colloids such as cellulose ethers, gelatin or incompletely hydrolysed polyvinylacetates.

The polymerisation is carried out in a closed vessel, generally under autogenous pressure. The additional vinyl halide containing monomeric material is preferably added in one increment at or shortly after the commencement of the pressure drop, i.e. before the pressure has dropped by more than about 30 psi or preferably 15 psi, in order to gain the maximum advantage with respect to increase of vessel productivity for a given reaction time.

The part addition of vinyl halide during the polymerisation is most conveniently carried out by adding all the vinyl halide at once so reducing the time spent supervising the addition to the minimum. It may not be physically possible to add all the vinyl halide at once due to limitations on the size of pipes etc, but in any case the addition must take place over not more than 15 minutes, and preferably over not more than 10 minutes. It is particularly preferred to carry out the addition of the vinyl halide monomer over not more than 5 minutes. The addition may be delayed after the pressure drop, but its effectiveness is reduced and the polymerisation time is more extended. The addition of monomer must take place during the period in which conversion of the monomer is in the range 70% to 80% of the monomer originally present. The additional monomer will generally raise the pressure to the saturated vapour pressure again and this is preferred. Preferably the amount added is from 2 to 30% of the initial change. The polymerisation is allowed to proceed after the addition of the vinyl halide to the degree of conversion of total vinyl halide to polymer which is normal for suspension polymerisation so completing the polymerisation.

It is generally found that by using the method of the present invention an increased yield can be obtained from a batch polymerisation without a proportional increase in polymerisation time. It is also found that the bulk density particularly of homopolymers can be increased.

The invention is illustrated by the following Examples:

EXAMPLE 1

A conventional vinyl chloride suspension polymerisation vessel was charged with water (131 parts by weight), an aqueous solution of a cellulose ether dispersant system (0.22 parts), and an initiator system comprising di-t-butylcyclohexylperoxydicarbonate (0.03 parts) and caprylyl peroxide (0.03 parts). The system was maintained at pH ca 7 by use of a pH adjuster. The polymerisation vessel was sealed, evacuated, and vinyl chloride (100 parts) was introduced into the vessel at room temperature. The temperature of the agitated vinyl chloride-in-water turbulence-stabilised dispersion was then increased to 58°C, and the polymerisation was allowed to proceed at this temperature until the pressure within the reaction vessel had fallen by 28 psi from the maximum pressure reached during the polymerisation (i.e. from ca 128 psig).

Fresh vinyl chloride (14.5 parts) was then introduced into the polymerisation vessel (with the reaction medium temperature maintained at 58°C), over a period of 4 minutes. This was sufficient to restore the pressure to the value before the beginning of the pressure drop. The polymerisation was allowed to continue until the pressure within the vessel had reached ca 60 psig. The total reaction time for the charge was 7 hours. The product was isolated by centrifugation and was then dried. The bulk density of the suspension PVC homopolymer produced was 568 kg/m$^3$.

EXAMPLE 2

A further suspension polymerisation was carried out according to the procedure outlined for Example 1, except that a vinyl chloride monomer post-addition stage, after a pressure-drop of 28 psig had occurred, was not carried out. The total time for the polymerisation was ca 6½ hours.

The bulk density of the dried PVC homopolymer product was 548 kg/m$^3$.

EXAMPLE 3

A conventional vinyl chloride suspension polymerisation vessel (not the one used in Example 1), was charged with town's water (170 parts by weight), an aqueous cellulose ether dispersant system (0.22 parts) and an initiator system comprising di-t-butylcyclohexylperoxydicarbonate (0.03 parts) and caprylyl peroxide (0.0247 parts). Vinyl chloride was introduced into the reactor and polymerised as in Example 1. Vinyl chloride (30 parts by weight) was fed in at the commencement of the pressure drop over a period of 3 minutes. This was sufficient to restore the pressure to its value before the start of the pressure drop. Polymerisation was continued as in Example 1. The results are given in the Table.

EXAMPLES 4 and 5

An experiment was carried out as in Example 3 except that 40 and 50 parts by weight of vinyl chloride were added at the commencement of the pressure drop. The results are given in the Table.

EXAMPLE B

In a comparative Example not according to the invention an experiment was carried out as in Example 3 but with the monomer added at a conversion of 90% of the original charge of monomer, instead of at the commencement of the pressure drop. The results are shown in the Table.

TABLE

| Example | Vinyl Chloride Injection | | | | Reaction Time (hours) | Bulk Density (kg/m$^3$) |
|---|---|---|---|---|---|---|
| | Quantity (parts) | Time | Conversion % | Pressure psig | | |
| 3 | 30 | At Commencement of pressure drop | ca 70 | ca 120 | 12.0 | 613 |
| 4 | 40 | " | ca 70 | ca 120 | 13.0 | 626 |
| 5 | 50 | " | ca 70 | ca 120 | 12.3 | 655 |
| B | 30 | After pressure | 90 | 80 | 16.0 | 590 |

TABLE-continued

| Example | Vinyl Chloride Injection | | | | Reaction Time (hours) | Bulk Density (kg/m³) |
|---------|---|---|---|---|---|---|
| | Quantity (parts) | Time | Conversion % | Pressure psig | | |
| | | drop | | | | |

We claim:

1. A batch process for the homopolymerization of a vinyl halide monomer which comprises homopolymerising the monomer in aqueous suspension in the presence of a monomer soluble free radical initiator until the start of the pressure drop and thereafter adding from about 2% to not more than 50% by weight of vinyl halide based on the initial charge over not more than 15 minutes in a period in which the conversion is in the range 70% to 80% of the monomer initially added, completing the polymerisation, and only then recovering the polymer.

2. A process according to claim 1 wherein the vinyl halide is added over not more than 10 minutes.

3. A process according to claim 2 wherein the vinyl halide is added over not more than 5 minutes.

4. A process according to claim 1 wherein the vinyl halide is added before the pressure has dropped by more than 30 psig.

5. A process according to claim 1 wherein the amount of vinyl halide added is from 2 to 30% by weight of the initial charge of vinyl halide.

6. A process according to claim 5 wherein the vinyl halide is added before the pressure has dropped by more than 15 psig.

7. Polyvinyl halide when made by a process according to claim 1.

* * * * *